Feb. 10, 1931.  W. YANTIS  1,791,695
APPARATUS FOR TREATING OIL
Filed Feb. 24, 1928  2 Sheets-Sheet 2
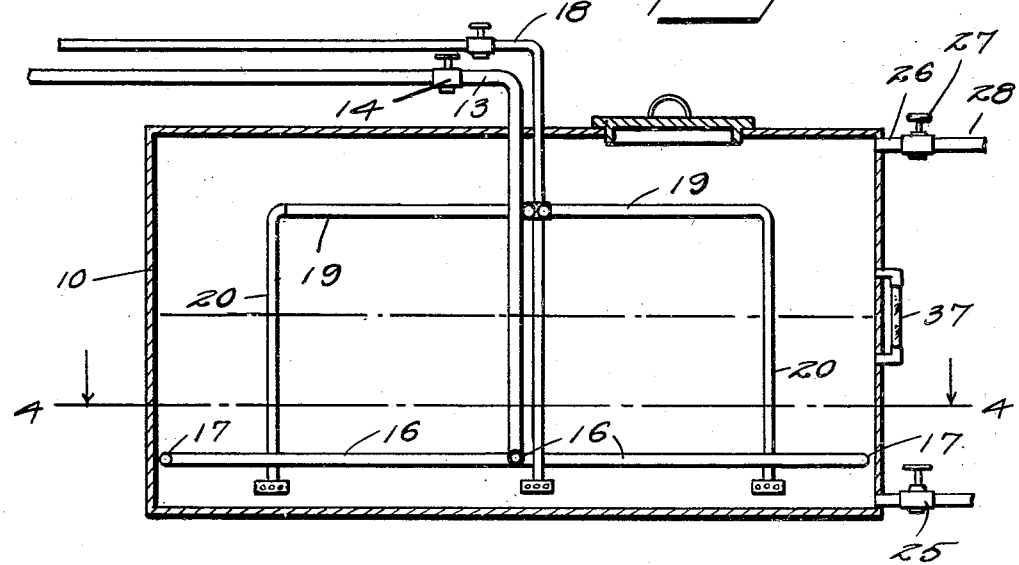
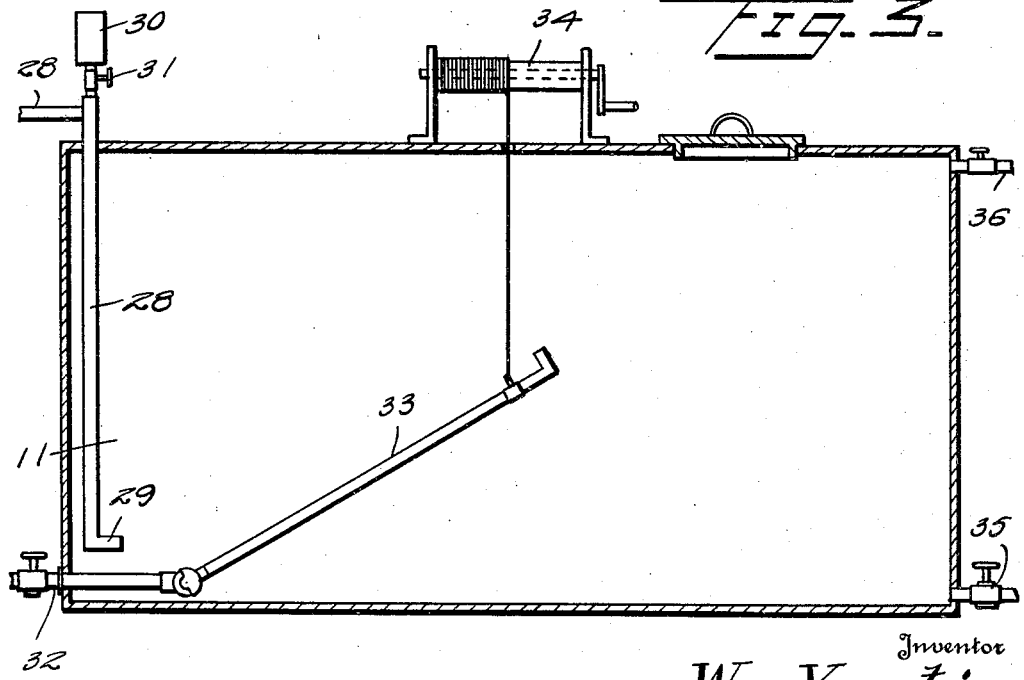
Inventor
W. Yantis
By Watson E. Coleman
Attorney

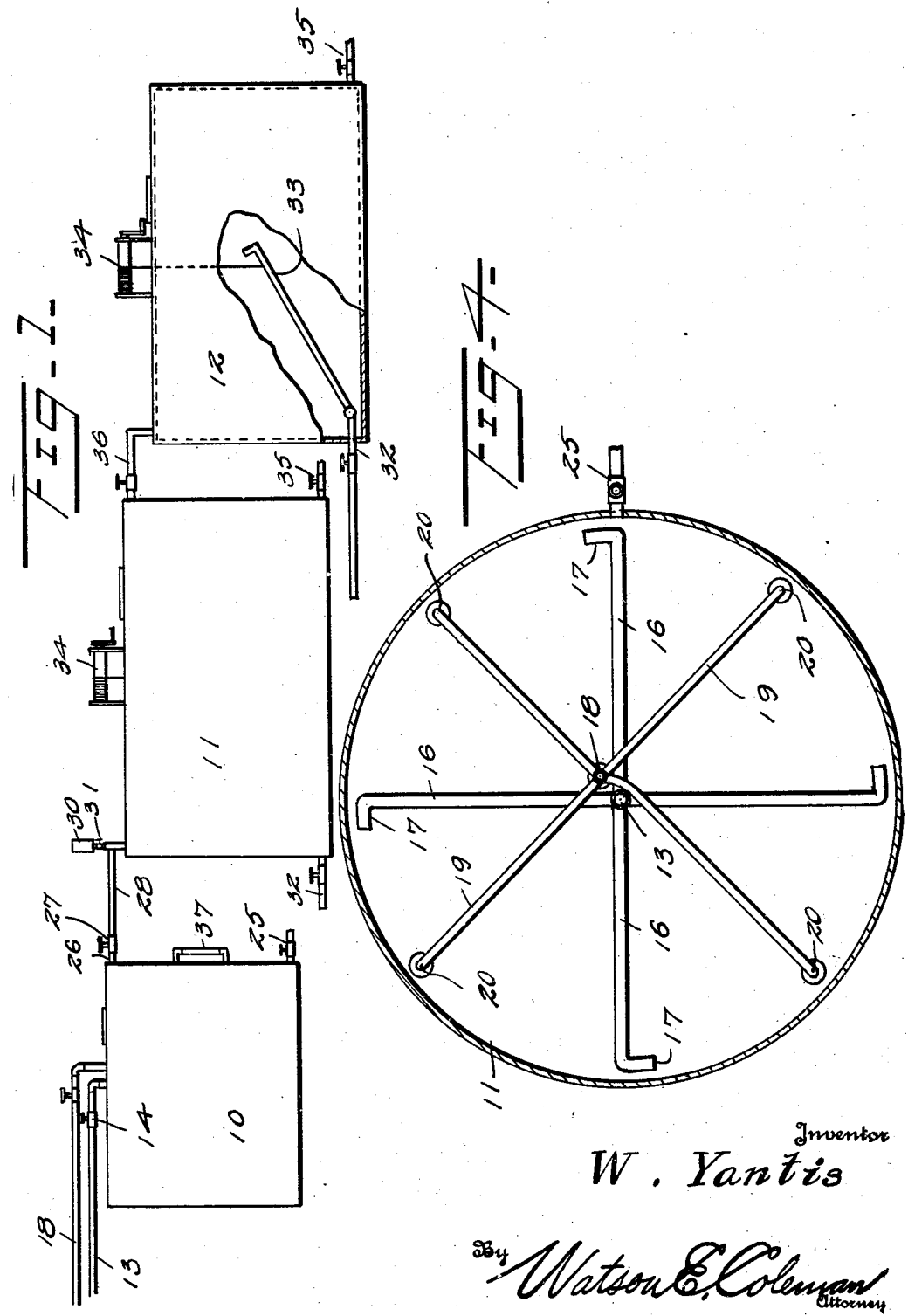

UNITED STATES PATENT OFFICE

WILLIAM YANTIS, OF CUSHING, OKLAHOMA

APPARATUS FOR TREATING OIL

Application filed February 24, 1928. Serial No. 256,789.

This invention relates to apparatus for treating oil and more particularly to a device for treating B. S. or cut oil to remove impurities and air therefrom to render the same fit for use.

A further object of the invention is to provide an arrangement which will permit purification of the oil without deterioration of the quality of the oil, such as results when treating oil in apparatus for this purpose with which I am familiar.

A still further object of the invention is to provide a device of this character which may be very readily and cheaply constructed, which will be durable and efficient in service and a general improvement in the art.

These and other objects I attain by the construction shown in the accompanying drawings, wherein for the purpose of illustration is shown a preferred embodiment of my invention and wherein:—

Figure 1 is a partially diagrammatic side elevation showing oil treating apparatus constructed in accordance with my invention, a portion of one of the tanks being broken away;

Figure 2 is a vertical sectional view through the tank in which the oil is initially introduced;

Figure 3 is a vertical sectional view through the tank in which the oil receives its final treatment;

Figure 4 is a section on the line 4—4 of Figure 2.

Referring now more particularly to the drawings, the numerals 10, 11 and 12 indicates tanks of increasing capacity, the tank 10 being preferably of about one hundred barrel capacity, the tank 11 of approximately two hundred and fifty barrel capacity and the tank 12 of two hundred and fifty barrel capacity. Each of the tanks 10, 11 and 12 is covered and the tank 10 has extending through the cover thereof an oil inlet pipe 13 controlled by a valve 14. This oil inlet pipe extends to a point adjacent to but spaced from the bottom 15 of the tank and is there provided with radially extending tubular arms 16, each of which is provided at its end with a horizontally extending outlet or nozzle 17 directed circumferentially of the tank. All of these outlets are preferably directed in the same direction, so that the oil will tend to circulate in the tank. Through the cover at the center thereof, a steam pipe 18 is entered, this pipe at a point spaced from the cover being provided with radially extending branches 19, which are horizontally directed and have downbent terminals 20 paralleling the side walls of the tank in spaced relation thereto. The lower ends of these branches and pipe 18 are provided with distributing heads or caps having small horizontally extending perforations or otherwise constructed to direct steam therefrom in finely divided streams and in a substantially horizontal direction. This tank has at its lower end a sludge and water outlet 25 and at its upper end and above the level of the branch pipes 19 of the steam pipe an oil outlet or overflow 26 controlled by a valve 27 and leading to the tank 11.

The outlet pipe 26 communicates with a vertically extending pipe 28 leading through the cover of the tank 11 and extending downwardly to a point adjacent to but spaced from the bottom of this tank at which point it is provided with a horizontally directed outlet 29. The upper end of the vertical pipe supports a container 30, the communication of which with the vertical pipe is controlled by a valve 31. Through this container may be introduced treatalite or soda ash. Each of the tanks 11 and 12 is provided adjacent its bottom with a valve controlled oil outlet 32 which, within the tank, communicates with a swiveled outlet pipe 33. The position of this outlet pipe is controlled by a windlass 34 arranged upon the covers of these tanks. Each of the tanks 11 and 12 is further provided with a sludge outlet 35. The tank 11 has an oil outlet 36 in its side wall adjacent its upper end, which discharges into the tank 12.

In operation, a predetermined water level is maintained in the tank 10, this tank being provided with a sight glass 37 to assist in determining the water level which is at a point above the levels at which oil and steam are admitted. The admission of steam which occurs simultaneously with the oil causes a horizontal zone of turmoil which is above the deposits upon the bottom of the tank and accordingly does not disturb the same but causes sufficient agitation of the water to result in thorough mixing of the heated water with the oil which is being treated. At the same time, the portions of the pipe 18 and its branches 19 which are disposed above the water level supply dry heat directly to the oil to drive any contained moisture therefrom. By introducing the steam to the water at a point below the point of admission of the oil, the heating of the oil is obtained without any actual contact of the steam therewith, thus materially benefiting the output, since I have found that steam contacting with oil and particularly with oils containing a large percentage of basic sediment gives to the same a brownish color which results in the oil being classed as low grade.

From the tank 10, the oil is passed to the tank 11 and at this time, a proper amount of treating substance, such as those mentioned, may be inserted in the tank. These substances facilitate the precipitation of sediment and are particularly effective with the oil, when heated, as it is when leaving the tank 10. The tank 12 provides auxiliary settling space and may be employed for storage, if desired.

Since the construction hereinbefore set forth is capable of a certain range of change and modification without materially departing from the spirit of the invention, I do not limit myself to such specific structure except as hereinafter claimed.

I claim:—

1. In an oil treating apparatus, a tank adapted to contain water, a series of alternately arranged nozzles and distributing heads within the tank below the surface of the water therein, an oil inlet pipe communicating with the nozzles, and a steam pipe communicating with the distributing heads.

2. In an oil treating apparatus, a tank adapted to contain water, a series of alternately arranged nozzles and distributing heads within the tank below the surface of the water therein, the nozzles being arranged in a common plane and the distributing heads being arranged below the plane of the nozzles, an oil inlet pipe communicating with the nozzles, and a steam pipe communicating with the distributing heads.

3. In an oil treating apparatus, a tank adapted to contain water, a series of alternately arranged nozzles and distributing heads within the tank below the surface of the water therein, the nozzles pointing in a common direction and the distributing heads having radial perforations, an oil inlet pipe communicating with the nozzles, and a steam pipe communicating with the distributing heads.

4. In an oil treating apparatus, a tank adapted to contain water, a series of alternately arranged nozzles and distributing heads within the tank below the surface of the water therein, the nozzles being arranged in a common horizontal plane and the distributing heads being arranged in a common horizontal plane below that of the nozzles, the nozzles pointing in a common direction and the distributing head being provided with horizontal perforations, an oil inlet pipe communicating with the nozzles, and a steam pipe communicating with the distributing heads.

5. In an oil treating apparatus, a tank adapted to contain water, an annular series of alternately arranged nozzles and distributing heads within the tank below the surface of the water therein, a distributing head arranged at the center of the series of nozzles and distributing heads, an oil inlet pipe communicating with the nozzles, and a steam pipe communicating with the distributing heads.

6. In an oil treating apparatus, a tank adapted to contain water, an oil inlet pipe extending centrally into the tank below a point near the bottom thereof, tubular arms extending radially from and communicating with the lower end of the pipe, nozzles extending in a common direction from the outer ends of the arms, a steam pipe extending into the tank alongside the oil pipe and having its lower end located near the bottom of the tank, branch pipes extending radially from the steam pipe above the lower end thereof and then extending downwardly to points between and below the nozzles, and perforated caps secured to the lower end of the steam pipe and to the lower ends of the branch pipes.

In testimony whereof I hereunto affix my signature.

WILLIAM YANTIS.